3,649,709
MODIFICATION OF POLYOLEFINICALLY UNSATURATED HYDROCARBON POLYMERS WITH MONO-OLEFIN MONOMERS
Dirk Medema, Henk J. Alkema, and Robert van Helden, Amsterdam, Netherlands, assignors to Shell Oil Company, New York, N.Y.
No Drawing. Filed May 9, 1969, Ser. No. 823,488
Claims priority, application Netherlands, June 17, 1968, 6828663
Int. Cl. C07c 3/62; C08f 27/00
U.S. Cl. 260—680 R      5 Claims

ABSTRACT OF THE DISCLOSURE

Conjugated diene polymers are reacted with mono-olefin monomers in the presence of a catalyst comprising the reaction product of an organometallic compound of a metal of Groups II–A, II–B, III–A, or III–B, with a salt of a metal of Groups IV–A, V–A, VI–A, VII–A, or VIII.

---

The invention relates to a process for the modification of polyolefinically unsaturated hydrocarbon polymers.

Polyolefinically unsaturated hydrocarbon polymers within the scope of this invention are hydrocarbon compounds with a molecular weight of at least 3,000, which contain one or more recurrent structures in their molecules, while each polymer molecule contains at least 20 olefinically unsaturated double bonds; if more than one recurrent structure is present, the different recurrent structures may alternate, may be present in a random sequence or in blocks.

Under modification of a polyolefinically unsaturated hydrocarbon polymer within the scope of this invention is to be understood a process whereby the structure of such polymer molecule is changed as a result of reaction of one or more olefinically unsaturated double bonds present in the polymer molecule with an olefinically unsaturated double bond present in an olefinically unsaturated compound.

Now, in accordance with the present invention, a process is provided for the modification of a polyolefinically unsaturated conjugated diene hydrocarbon polymer which comprises contacting said polymer with one or more mono-olefinically unsaturated hydrocarbon monomers (as defined hereinafter) in the presence of a catalyst which comprises the reaction product of a component A consisting of one or more organometallic compounds of Groups II–A, II–B, III–A, or III–B of the Periodic System of Elements and a component B consisting of one or more salts of a transition metal of Groups IV–B, V–B, VI–B, VII–B, and VIII, the Group VIII metals having atomic numbers between 44 and 77. These include molybdenum, tungsten, niobium, tantalum, rhenium, ruthenium, osmium, iridium, hafnium, zirconium, manganese, vanadium chromium, rhodium, or palladium.

Very suitably, a polyolefinically unsaturated hydrocarbon polymer, further in this specification to be called the polymer, is prepared by polymerization of conjugated diene hydrocarbon monomers, at least part of which monomers contain one or more olefinically unsaturated double bonds after they have been incorporated in the polymer.

Very suitable monomers for the preparation of the polymers to be modified are acyclic dienes, in particular dienes and preferably conjugated dienes such as isoprene and in particular butadiene.

Monomers which are useful to be copolymerized with these dienes and polyenes and which after having been incorporated in the polymer do not contain one or more olefinically unsaturated double bonds are hydrocarbon monomers which contain only one olefinically unsaturated double bond, such as alkenes and aromatic compounds containing one olefinically unsaturated bond. In the class of alkenes the 1-alkenes are very eligible, in particular the 1-alkenes with up to 12 carbon atoms; propene, 1-butene, isobutene, 1-pentene and 1-hexene are preferred. In the class of aromatic compounds containing one olefinically unsaturated bond to be used as comonomer for the preparation of the polymer, compounds wherein the olefinically unsaturated bond is in conjugation with the aromatic ring are very suitable, and in this class the compounds having an alpha olefinically unsaturated bond are preferred. As examples may be mentioned styrene, alpha-methyl styrene, 2-methyl styrene, 3-methyl styrene, and 4-methyl styrene; styrene is in particular preferred.

Examples of suitable polymers which can be obtained by homopolymerization of dienes or polyenes are polybutadiene and polyisoprene, examples of suitable polymers which can be obtained by copolymerization of one or more dienes with one or more hydrocarbon monomers which contain one olefinically unsaturated bond are random and block copolymers of butadiene and styrene and random or block copolymers of isoprene.

The polymers which have been obtained by polymerization of acyclic dienes are further called acyclic polymers; in general no large carbon rings are formed therein during polymerization.

Another type of monomers which can be polymerized to polyolefinically unsaturated hydrocarbon polymers are mono- or polyunsaturated alicyclic compounds, wherein the olefinically unsaturated bond which takes part in the polymerization reaction is situated in a ring, and wherein preferably one of the ring carbon atoms which are part of an olefinically unsaturated bond in the ring, and most preferably both of the ring carbon atoms which are part of such an olefinically unsaturated bond, are bound directly to a hydrogen atom.

Polymerization of this type of monomers may give rise to the formation of polymers which comprise large hydrocarbon rings, and which are further called cyclic polymers.

The monomers used for the preparation of the cyclic polymers may be mono- or polycyclic preferably containing not more than four rings. They may be substituted by alkyl, aryl, alkaryl or arylalkyl groups. Monocyclic olefinically unsaturated compounds with five, seven, eight or more ring carbon atoms and one to three double bonds in the ring, at least one of which double bonds is not conjugated with another double bond are preferred. Examples of such compounds are 1,4- and 1,5-cyclooctadiene and in particular cyclopentene, cyclooctene, cyclododecene.

The molecular weight of the acyclic or cyclic polymer is preferably higher than 3,000, in particular higher than 50,000. An amount of olefinically unsaturated double bonds per molecule of the polymer of at least 20, in particular of at least 100, is preferred. Dependent upon the type of reaction desired, the diene polymers may have a relatively high cis 1,4-content (greater than about 90%) or a substantial amount of 1,2-content (greater than about 25%).

Modification of the polymers is accomplished by reacting the polymers with one or more mono-olefinically unsaturated monomeric hydrocarbons (further to be called the olefins). These olefins may (a) have the structure

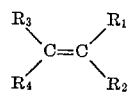

wherein $R_1$, $R_2$, $R_3$, and $R_4$ independently denote a hydrogen atom or an alkyl, aryl, alkenyl, alkaryl, aryl, alkyl, cycloalkyl group or may (b) consist of mono- or polycyclic compounds having one or more olefinically unsaturated bonds between two carbon atoms which form part of a ring.

If the olefin to be reacted with the polymer is an acyclic monoolefinically unsaturated non-polymeric compound (as described under (a) above further to be called the acyclic olefin) it is preferred, that in the formula given at least $R_1$ and $R_3$ are not hydrogen. Most preferred are hydrocarbons wherein the carbon atoms which form part of the double bond both bear one hydrogen atom, in other words compounds wherein $R_2=R_4=$ hydrogen and $R_3$ and $R_1$ are not hydrogen. Of this class acyclic mono-olefins, such as 2-butene, 2-pentene, 3-pentene, 3-hexene, 2-methyl-2-pentene, 2-methyl-3-pentene, tetramethylethylene are preferred.

If the olefinically unsaturated compound to be reacted with the polymer consists of a cyclic compound having one or more olefinically unsaturated bonds between two carbon atoms which form part of the ring (as described under (b) above, further to be called a cyclic olefin), it is preferred that at least one, and preferably both of the carbon atoms which take part in the formation of such an olefinically unsaturated bond are bound directly to a hydrogen atom. In this class monocyclic hydrocarbons with one double bond in their cyclic structure, in particular cyclopentene, cyclooctene and cyclododecene are preferred.

It is to be understood that no modification occurs in cases wherein the molecular structure of the polymer is not changed, and the olefin to be reacted with a polymer, after reaction, is undistinguishable from the monomer units already present in the polymer. For example, a reaction between a polymer obtained by polymerization of cyclooctene and cyclooctene is not to be considered modification of a polymer within the scope of this invention.

The reactions which are believed to take place during modification of polyolefinically unsaturated hydrocarbon polymers according to the invention can be depicted by the following scheme:

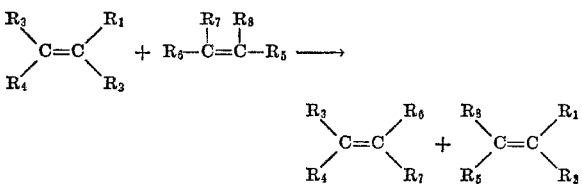

wherein $R_1$, $R_2$, $R_3$, and $R_4$ have the meaning given above $R_5$ denotes a hydrocarbon radical comprising a chain of carbon atoms (which may be branched) which chain forms part of the polymer, $R_6$, $R_7$, and $R_8$ denote either a hydrocarbon radical similar to $R_5$ or part of a monomer unit wherefrom the polymer is built up (e.g., a hydrogen atom or methyl group). If at most one of the radicals $R_6$, $R_7$, or $R_8$ is similar to $R_5$ the polymer will in general be soluble in one or more solvents; in cases wherein two or more of the radicals $R_6$, $R_7$, or $R_8$ are similar to $R_5$ the polymer will in general not be soluble in a solvent owing to cross-linking.

The modification of polymers according to the invention can lead to the formation of several types of products, depending on the site, structure and amount of the double bonds present in the polymer, the structure of the olefin to be reacted with the polymer and the ratio of the reactants.

The following possibilities of modification of polyolefinically unsaturated hydrocarbon polymers are given by way of example.

(1) Reaction of a double bond present in the backbone of a polymer with the double bond of an olefin wherein the double bond to be reacted is not present in a cyclic structure: The polymer molecules which react will be split into two parts, which are each attached to part of the olefin and the molecular weight of the polymer will be decreased. It should be remarked that the molecular weight of the modified polymer is regulated by the amount of acyclic olefin reacted with the polymer. If the total number of double bonds in the acyclic olefin molecules exceeds the total number of double bonds present in the backbone of the polymer, the polymer can be broken down to small units. In order to obtain modification products with a structure as uniform as possible, which is of special importance if a polymer is broken down to small units, acyclic olefins wherein the moiety

is identical with the moiety

are very suitable. Of this type of acyclic olefins 2-butene and 3-hexene, and in particular cis-2-butene are preferred. For example, reaction of 1,4-polybutadiene with an excess of 2-butene results in the formation of 2,6-octadiene.

(2) Reaction of a double bond present in the backbone of a polymer with a double bond which is present in a cyclic structure of a cyclic olefin: The olefin will be incorporated in the backbone of the polymer giving rise to the formation of a copolymer which contains units derived from the cyclic olefin in its backbone; the molecular weight of the polymer is increased.

For example, reaction of 1,4-polybutadiene with cyclooctene gives rise to incorporation of the cyclooctene and to molecular weight increase of the polymer. Since cycloolefins can be homopolymerized under the influence of the catalyst system to be used, it is of advantage in order to accomplish the reactions according to the invention, to keep the concentration of the cyclic olefin to be incorporated in the backbone of the polymer low as compared with the total amount of double bonds present in the backbone of the polymer. This can be accomplished, for example, by gradual addition of the cyclic olefin to the polymer.

(3) Reaction of a double bond present in a side chain of the polymer with a double bond, of an olefin which is present in a cyclic structure. The side chain of the polymer will be changed; according to the structure of the reactants it can be lengthened or shortened. For example, reaction of the side chain originating from a 1,2-polymerized butadiene unit with 3-hexene will give rise to a side chain with four carbon atoms according to the scheme:

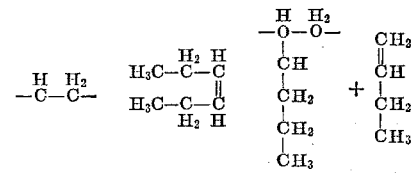

(4) Reaction of a double bond present in a side chain of the polymer with a double bond which is present in a cyclic structure of a cyclic olefin. The cyclic olefin will be incorporated in the side chain of the polymer, which side chain accordingly will be lengthened. The molecular weight of the polymer will also be increased. For example, reaction of the side chain originating from a 1,2 polymerized butadiene unit with cyclooctene will give rise to a diolefinically unsaturated side chain with ten carbon atoms. Since as discussed under (2) cycloolefins can be homopolymerized under the influence of the catalyst system to be used, it is of advantage to keep the concentration of the cyclic olefin to be incorporated in the side chain of the polymer low as compared with the total amount of side chains containing unsaturated double bonds present in the polymer.

Since the catalyst is not a single compound, it can be described as a catalyst system, comprising the reaction product of two components, A and B.

The first compound A of the catalyst system consists of one or more organometallic compounds of Groups II-A, II-B, III-A, or III-B of the Periodic Table of Elements. Examples of metals, wherefrom this component A can be derived are beryllium, magnesium, calcium, strontium, barium, zinc, cadmium, aluminum, gallium, indium, and thallium. Organometallic compounds derived from magnesium, zinc, and cadmium are in particular suitable, but organometallic compounds derived from aluminum being preferred.

Examples of aluminum compounds with three aluminum-carbon bonds are trialkylaluminum compounds, e.g., trimethylaluminum, triethylaluminum, tri-n-propylaluminum, tri-n-butylaluminum, triisopropylaluminum, triisobutylaluminum, trihexylaluminum, trioctylaluminum, triarylaluminum compounds such as triphenylaluminum, tritolylaluminum. Examples of aluminum compounds with two aluminum-carbon bonds are the dialkylaluminum halides, such as diethylaluminum chloride, di-n-propylaluminum chloride, diisobutylaluminum chloride, diethylaluminum bromide, diethylaluminum iodide, diethylaluminum fluoride; diarylaluminum halides such as diphenylaluminum chloride, ditolylaluminum chloride, diphenylaluminum bromide, ditolylaluminum bromide; dialkylaluminum hydrides such as diethylaluminum hydride, di-n-propylaluminum hydride, diisobutylaluminum hydride; diarylaluminum hydrides such as diphenylaluminum hydride, ditolylaluminum hydride; arylalkylaluminum hydrides such as ethylphenylaluminum hydride. Examples of aluminum compounds with one aluminum-carbon bond are the monoalkylaluminum dihalides such as ethylaluminum dichloride, ethylaluminum dibromide, propylaluminum dichloride, isobutylaluminum dichloride, ethylaluminum diiodide; alkylaluminum dihydrides such as ethylaluminum dihydride, butylaluminum dihydride, isobutylaluminum dihydride; arylaluminum dihalides such as phenylaluminum dichloride, phenylaluminum dibromide. phenylaluminum diiodide, tolylaluminum dichloride, tolylaluminum dibromide, tolylaluminum diiodide, arylaluminum dihydrides such as phenylaluminum dihydride, tolylaluminum dihydride.

Mixtures of aluminum compounds with one or more aluminum-carbon bonds can also be used as component A of the catalyst, for example, mixtures of dialkylaluminum halides and alkylaluminum dihalides such as ethylaluminum sesquichloride and bromide.

Compounds containing other metals besides aluminum, such as tetrabutyllithium aluminum, tetraethyllithium aluminum are also very suitable.

Compounds containing an alkaline earth metal can also be used as component A of the catalyst. As examples may be mentioned dihphenylmagnesium, diethylmagnesium, ethylmagnesium chloride, ethylmagnesium bromide, phenylmagnesium chloride, butylmagnesium bromide, diethylbarium, diethylcalcium, diethylstrontium. Examples of compounds of metals of Group II-B of the Periodic Table which can be used as component A of the catalyst system, are diethylzinc, diethylcadmium, dibutylcadmium, diphenylzinc, ethylzinc chloride.

Trialkylaluminum compounds, dialkylaluminum monohalides, monoalkylaluminum dihalides and mixtures of these types of compounds are in particular preferred.

The second component B of the catalyst system consists of one or more salts of molybdenum, tungsten, niobium, tantalum, rhenium, ruthenium, osmium, iridium, hafnium, zirconium, titanium, manganese, vanadium, chromium, rhodium, or palladium. Salts of tungsten, molybdenum or rhenium are preferred. As examples of salts may be mentioned halides, sulfates, nitrates, phosphates, salts of organic carboxylic acids, such as acetates, propionates, benzoates, acetylacetonates. Mixtures of these salts can also be used. Halides and especially chlorides are preferred; salts in particular suitable to be component B of the catalyst system are tungsten hexachloride and molybdenum pentachloride.

It is often of advantage to use a catalyst system which besides components A and B comprise a third component C, which acts as a promoter and increases the activity of the catalyst system in the modification of polyolefinically unsaturated hydrocarbon polymers according to the invention.

The third component C of the catalyst system consists of one or more compounds with structure RXH, wherein X denotes oxygen or sulfur and wherein R denotes a hydrogen atom or a hydrocarbon radical such as an alkyl, aryl, alkaryl, aralkyl, cycloalkyl or alkenyl radical in which radicals one or more hydrogen atoms may be replaced by an —OH or —SH group, or wherein R denotes a radical with structure R'—C—Y— in which R' stands for hydrogen or the same radicals as defined for R, and Y is oxygen or sulfur. Examples of compounds which can be used as component C of the catalyst system are water; alcohols such as methanol, ethanol, isopropanol, 1-butanol, 2-butanol, tert-butylalcohol, cyclohexanol, phenol, alpha- and beta-naphthol; polyalcohols such as ethylene glycol, propylene glycol, glycerol, hydroquinone, resorcinol, pyrocatechol, pyrogallol; mercaptan such as methyl, ethyl, octyl, dodecyl mercaptan thiophenol; hydroperoxides such as tert-butyl hydroperoxide, cumyl hydroperoxide; polymercaptans such as 1,3-propanedithiol, 1,4-dithiolbenzene; hydroxy mercaptans such as 2-mercaptoethanol, and p-mercaptophenol.

Components C which contain hydroxyl groups are preferred, in particular alcohols, and more in particular methanol, ethanol, and isopropanol.

The amount of component C which may be present in the catalyst system is strongly related to the amounts of the components A and B, since large amounts of component C compared with the amounts of components A and B strongly retard or even inhibit the modification of polyolefinically unsaturated hydrocarbon polymers according to the invention. Molar ratios of components B and C between 0.3 and 20 are very useful, molar ratios between 0.5 and 5 being preferred. Molar ratios of components A and B which are very useful if component C is present lie between 0.5 and 15, molar ratios between 0.5 and 10 being preferred. Molar ratios of components B and C between 1 and 2, and of components A and B between 0.75 and 5 are in particular preferred.

In cases wherein no component C is present in the catalyst system a molar ratio of components A and B between 0.5 and 15, in particular between 0.6 and 10, and preferably between 0.75 and 5 is very suitable.

The process for the modification of polyolefinically unsaturated hydrocarbon polymers according to the invention can be carried out in the absence or in the presence of solvent, which does not take part in the modification reaction. If no such solvent is present, the catalyst system is dissolved in the olefin monomer. In general a solvent will be preferred in order to obtain a homogeneous solution of all reactants. In cases wherein the polymer is insoluble the modification can be accomplished by contacting the polymer with the olefin and the catalyst system, the latter two components being in a homogeneous solution. If a solvent which does not take part in the modification reaction is used, this solvent must not readily react with the catalyst system or with one of its components or with he polymer or the olefin. As examples of solvents can be mentioned aliphatic, cycloaliphatic and aromatic hydrocarbons, such as pentane, hexane, petroleum ether, decane, cyclohexane, cyclooctane, Decalin, benzene, toluene, tetralin, and mixtures thereof.

During the modification reaction, the catalyst or parts thereof are gradually precipitated, and the activity of the catalyst declines. If, however, an aromaic compound is present in the reaction mixture as a solvent or so component of the solvent, this precipitation and activity decline of the catalyst are strongly decreased. For this reason aromatic solvents and solvents containing aromatic compounds are preferred, in particular solvents consisting of or containing benzene and/or toluene.

The amount of catalyst to be used for the modification of polyolefinically unsaturated hydrocarbon polymers according to the invention was found not to be very critical. Optimum amounts of catalysts depend on the composition of the catalyst, the type of reaction components, their purity, temperature, desired reaction time, type and amount of solvent (if any) and the like. In general and amount of one mole of catalyst component B per $10^3$ to $10^6$, preferably $10^3$ to $10^5$ double bond equivalent present is very useful.

The amount of components A and, if present, C to be used are related to the amount of component B as described hereinbefore.

The catalyst system may be formed in situ by addition of the catalyst components A, B, and C (if any) to the mixture or to one of the compounds to be reacted, or the catalyst system can be formed in the absence of the compounds to be reacted. In all cases it is of advantage and preferred not to mix the components A and C in the absence of component B. For example, a catalyst system prepared by mixing components A, B, and C, or C, B, and A in the sequences mentioned is somewhat more active than a catalyst system prepared by mixing (in the sequences mentioned), A, C, and B, or C, A, and B. If a catalyst system has been prepared in the absence of the compounds to be reacted it has been found of advantage to use the catalyst system soon after its formation, since ageing of the catalyst system in some cases impairs the catalytic activity for the modifying of olefinically unsaturated hydrocarbon polymers according to the invention.

The preparation of the catalyst system and the reaction of the polymer and the olefin under the influence of the catalyst system are conveniently carried out in an inert amtosphere consisting of e.g., nitrogen, or a rare gas such as helium or argon. Saturated hydrocarbons such as methane and ethane are also suitable for this purpose.

The temperature during the process according to the invention is not very critical, and may vary between wide limits. Although temperatures between —100° C. and +100° C. and even higher can be used, it is one of the special features of the process of the invention that it can be carried out at or near room temperature, and accordingly temperatures between 0° C. and 100° C., in particular between 0° and 60° C., are preferred.

The pressure during the process according to the present invention also is not very critical. Pressures of up to 100 atmospheres can be used, but the reaction is most conveniently carried out at a pressure between 0.1 and 20 atmospheres, in particular at a pressure of about one atmosphere or at the pressure of the saturated vapor of the olefin present at the reaction temperature concerned, if the latter pressure is higher than one atmosphere.

After the reaction has been completed, or has been carried out to a desired degrees of conversion, it is advantageous to deactivate the catalyst system before components are isolated from the reaction mixture. Deactivation of he catalyst system can be accomplished by addition of a relatively large amount of a compound which is suitable as component C of the catalyst system, e.g., water, methanol, ethanol, isopropanol.

The products formed and any unreacted olefin can be isolated from the reaction mixture by means of well-known techniques. Those porducts which do not decompose at their boiling temperature at atmospheric or reduced pressure can be obtained, for instance, by distillation or gas choramtographic techniques. Products with a high molecular weight which are unsuited to distillation can be obtained, for example, by precipitation by means of addition of a non-solvent, or they can be obtained as distillation residue after distilling off volatile products.

The products obtained according to the process of the invention can be used for several purposes, depending on their structure and molecular weight.

High-molecular-weight polymers which have been obtained by modification of polyolefinically unsaturated hydrocarbon polymers with olefins can be used as rubbers. If part or all of the olefin has reacted with double bonds in side chains of the polymer, the products obtained can be used as additives for lubricating oils or as precursors for additives for lubricating oils, provided the polymers have become oil-soluble owing to lengthening of the side chains.

Lower-molecular-weight products obtained by modification of the polymers with an excess of acyclic olefins according to the invention can be used after partial hydrogenation, if desired, for the preparation of alcohols, e.g., by hydration, or by reaction with carbon monoxide and hydrogen (so-called hydroformylation or oxonation). Polyhydric alcohols so obtained are useful in alkyd resins and as precursors of polyurethane fibers formed from reaction products of the polyhydric alcohols and polyisocyanates such as toluene diisocyanate. Monohydric alcohols so obtained are e.g., suitable as precursors for the preparation of esters useful as, e.g., plasticizers or starting materials for the preparation of lubricating oil additives. These alcohols can also be used for the preparation of detergents by means of, e.g., sulfation or condensation with ethylene oxide and/or propylene oxide.

Lower-molecular-weight products obtained according to the process of the invention may, after partial hydrogenation if desired, be oxidized, e.g., to carboxylic acids, or converted to carboxylic acids by reaction with carbon monoxide and water with the aid of acid catalysts.

Lower-molecular-weight products obtained according to the process of the invention can also, if desired after partial hydrogenation, be used as component in ethylene-propylene copolymerization for the preparation of polymers useful as synthetic elastomers.

EXAMPLE I

Cis-2-butene (5.6 g., 100 mmoles) was added to a viscous solution of 1.02 g. polybutadiene (cis 1,4 content>96%, molecular weight>100,000) and 0.02 mmole tungsten hexachloride in toluene (10 ml.) at 0° C., under a blanket of nitrogen. Subsequently a solution of ethyl-aluminum dichloride (0.08 mmole) in toluene (0.82 ml.) was added. The solution became thin-liquid after a few minutes. After 45 minutes the reaction was stopped by addition of 0.1 ml. of ethanol. Upon distillation no polymer residue was found, which indicates that over 99% of the polymer had been converted. The main products present in the distillate, which were isolated by preparative gas chromatography, were 2,6-octadiene (1.2 g.) and 2,6,10-dodecatriene (0.3 g.).

EXAMPLE II

Two-pentene (0.5 g.) was added to a solution of polybutadiene (10 g., cis 1,4-content about 96%, molecular weight about 100,000) in toluene at 10° C. under a blanket of nitrogen, the solution also containing about 0.01 mmole of molybdenum chloride. Subsequently, a toluene solution of diethyl aluminum chloride (0.04 mmole) was added. After about 30 minutes the reaction was stopped by addition of one milliliter of methanol. It was found that the reaction product comprised a polybutadiene of lower-molecular-weight than the starting polymer, and that the polymer was substituted with butene substituents.

EXAMPLE III

An isopentane solution of polyisoprene having a cis 1,4-content of about 94% (100 g.) was reacted with cyclooctene (5 g.) at about —10° C. for about 1 hour, the catalyst being the reaction product of equal molar amount of rhenium chloride and aluminum triethyl. The product obtained had an increased molecular weight over that of the starting polymer and comprised polyisoprene having side chains of polycyclooctene.

EXAMPLE IV

A 10% benzene-butane solution of a polybutadiene having a molecular weight around 250,000 and containing about 60% 1,2-structure (15 g. polymer) was reacted with 3-hexene (0.75 g.) at about 0° C. in the presence of a catalyst comprising the reaction product of 1 mole of vanadium chloride with 5 moles of aluminum triisopropyl. The product was isolated after about 2 hours of reaction and was found to be a polybutadiene of increased molecular weight, the increased molecular weight being due to the extension of the vinyl side chains by reaction with 3-hexene.

EXAMPLE V

An isopentane solution of a polyisoprene having about 500,000 molecular weight and containing about 30% by weight of 1,2-configuration (100 g.) was reacted with cyclooctene (1 g.) in the presence of a catalyst comprising the reaction product of rhodium chloride with an equal molar amount of isobutyl aluminum dichloride. The product isolated after about 1 hour of reaction at about −5° C. and was found to be a modified polyisoprene having polycyclooctene branches thereof.

We claim as our invention:

1. The process for the preparation of essentially monomeric acyclic polyenes which comprises reacting a mixture of a conjugated diene polymer having a molecular weight of at least 3000 and an acyclic olefin, wherein the number of double bonds of the acyclic olefin molecules exceeds the total number of the double bonds present in the backbone of the polymer and wherein the acyclic olefin is selected from the group consisting of 2-butene and 3-hexene, said reaction being conducted in the presence of a catalyst mixture comprising an aluminum alkyl halide and a halide of a Group VI–B metal.

2. A process according to claim 1 wherein the conjugated diene is butadiene.

3. A process according to claim 2 wherein the acyclic olefin is 2-butene.

4. A process according to claim 3 wherein the Group VI–B metal halide is tungsten hexachloride.

5. A process according to claim 4 wherein the aluminum alkyl halide is aluminum ethyldichloride.

References Cited

UNITED STATES PATENTS

| | | | |
|---|---|---|---|
| 3,530,196 | 9/1970 | Singleton | 260—680 |
| 3,535,401 | 10/1970 | Calderon et al. | 260—683 |
| 3,558,518 | 1/1971 | Zuech | 252—429 |
| 3,211,710 | 10/1965 | Hendriks et al. | 260—94.7 X |
| 3,437,649 | 4/1969 | Mueller | 260—94.7 |
| 3,476,831 | 11/1969 | Daumiller et al. | 260—879 |
| 3,494,983 | 2/1970 | Diem | 260—879 X |

PAUL M. COUGHLAN, JR., Primary Examiner

U.S. Cl. X.R.

252—429 A, 429 B; 260—94.7 R, 94.7 D, 677 R